Figure 1:
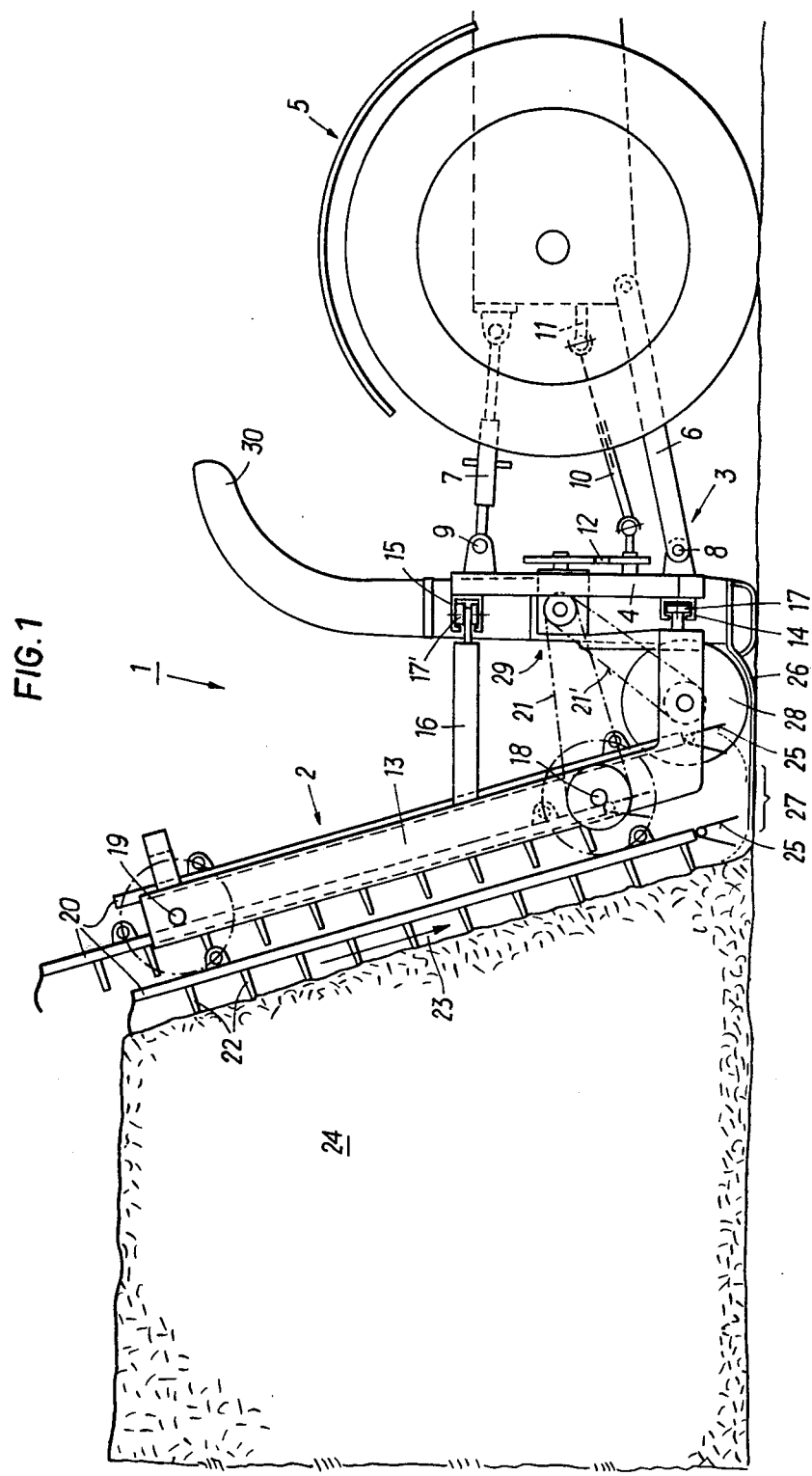

United States Patent [19]

Wolf

[11] 4,243,346
[45] Jan. 6, 1981

[54] UNLOADER FOR TAKING FEED FROM A HORIZONTAL SILO

[75] Inventor: Johann Wolf, Scharnstein, Austria

[73] Assignee: Johann Wolf Gesellschaft m.b.H. KG, Scharnstein, Austria

[21] Appl. No.: 15,737

[22] Filed: Feb. 27, 1979

[30] Foreign Application Priority Data

Mar. 22, 1978 [AT] Austria ................................. 2040/78

[51] Int. Cl.³ ...................... B65G 53/40; B65G 25/02
[52] U.S. Cl. ...................................... 406/57; 198/517; 198/737; 406/76; 414/304
[58] Field of Search ...................... 406/39, 41, 42, 57, 406/73, 76, 77, 80, 81; 414/133, 304; 198/519, 517, 737, 740

[56] References Cited

U.S. PATENT DOCUMENTS

| 1,532,022 | 3/1925 | Bamford et al. | 198/737 X |
| 1,749,785 | 3/1930 | Smith | 198/740 X |
| 3,021,180 | 2/1962 | Crump | 406/77 X |
| 3,363,785 | 1/1968 | Kucera | 198/519 X |

FOREIGN PATENT DOCUMENTS

| 1124427 | 8/1962 | Fed. Rep. of Germany . | |
| 1201598 | 9/1965 | Fed. Rep. of Germany . | |
| 1915209 | 10/1970 | Fed. Rep. of Germany . | |
| 2204832 | 8/1973 | Fed. Rep. of Germany . | |
| 2225783 | 12/1973 | Fed. Rep. of Germany . | |
| 6704698 | 10/1967 | Netherlands | 406/57 |

*Primary Examiner*—Jeffrey V. Nase
*Attorney, Agent, or Firm*—Young & Thompson

[57] ABSTRACT

Crank-operated rods are mounted on two vertically spaced apart crankshafts, which are driven to rotate in the same sense. Working tools are carried by said rods on the side thereof which faces the body of silage and penetrate said body as they move downwardly. Each crank-operated rod is provided at its lower end with at least one depending conveying tine, which at least during part of the movement of the respective crank-operated rod away from the body of silage moves over a bottom plate, which extends under all juxtaposed crank-operated rods and is trough-shaped on the side that faces away from the working tools.

11 Claims, 2 Drawing Figures

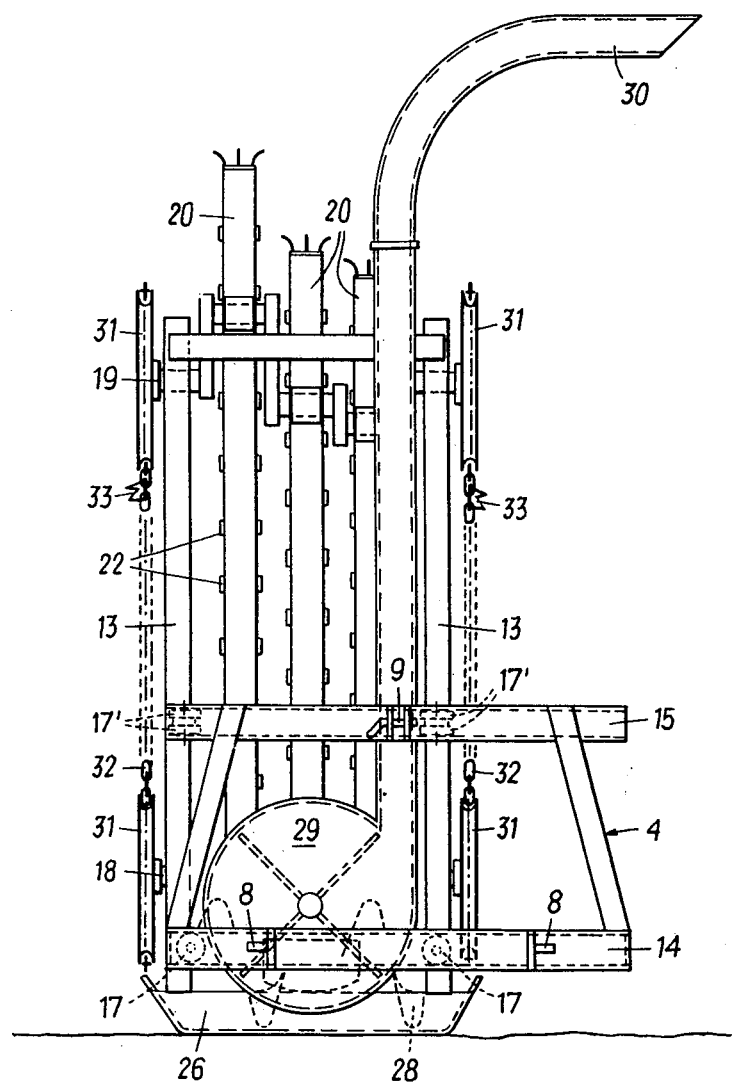

UNLOADER FOR TAKING FEED FROM A HORIZONTAL SILO

This invention relates to an unloader for taking feed from a horizontal silo, comprising a removing apparatus, which acts uniformly throughout the height of the body of silage and comprises tools, which enter and leave the body of silage in alternation and which has associated therewith a conveyor that is arranged on a bottom plate and receives feed near the bottom and consists, e.g., of a conveyor screw provided with a material-handling blower or belt conveyor.

An unloader of that kind is known from Opened German specification No. 2,225,783. That known unloader for taking feed from horizontal silos comprises a rotary cutter drum, which is guided by means of slide blocks in laterally arranged, vertical guides and can be moved up and down in the guides by drive means. Arms are provided, which are hydraulically operated to move the rotary cutter drum up and down. These arms may be pivoted so that they can oscillate along arcuate paths. Alternatively, the rotary cutter drum may be carried by telescopic arms. In that known arrangement the feed which has been removed is conveyed to a material-handling blower by a conveyor screw, which is disposed on the floor. Similar apparatus are shown in Opened German specification No. 2,204,832 and Austrian Patent specification No. 330,497.

The rotary cutter drum moved over the body of silage must apply a high contact pressure and for this reason requires strong drive means. As a result, the several elements must be sufficiently strong. Rotating at high speed, the rotary cutter drum effectively loosens the end face of the body of silage and thus permits of a relatively deep penetration of air and moisture into said body because the latter presents a large surface area. This adversely affects the quality of the silage feed. Besides, the rotary cutter drum rotating at high speed scatters parts of the feed, which are lost or must be gathered by time-consuming manual work.

Other unloaders comprise reciprocating cutting implements, such as chain saws or blade saws, and means for disintegrating the bunches of silage which have been removed.

Whereas the implements which remove the silage by means of moving cutting tools form smooth surfaces of cut, they can remove silage only at a limited rate and require an additional expenditure for disintegrating the feed parcels which have been sawn or cut off.

Known agricultural conveyors consist of so-called push-rod loaders, in which working tools are carried by crank-operated rods, which are mounted on crankshafts. Such push-rod loaders are known, e.g., from German patent specification No. 1,124,427 and German Patent Publication No. 1,201,598. In these push-rod loaders, the working tools move upwardly as they penetrate the material, which is to be conveyed upwardly, e.g., into a vehicle. In push-rod conveyors it is also known to provide different working tools on the crank-operated rods (see Opened German specification No. 1,915,209).

It is an object of the invention to eliminate the disadvantage of the known unloaders and to provide a removing apparatus which detaches the silage and pulls it away from the body of silage and which removes the silage at a high rate, does not scatter parts of the silage, is simple in structure and comprises as many identical components as possible. Besides, a loosening of the silage at the end face of the body of silage to a substantial depth should be avoided. The removing apparatus should also be suitable for processing relatively long silage, such as is supplied to short-chopping and loading trailers, at an adequate rate and as uniformly as possible.

In an unloader of the kind described first hereinbefore, this object is accomplished according to the invention in that crank-operated rods are mounted in known manner on two vertically spaced apart crankshafts, which are driven to rotate in the same sense, said crank-operated rods carry working tools on the side of said rods which faces body of silage, the vertical extent of the crank-operated rods is approximately as large as the height of the body of silage, the working tools penetrate into the body of silage as they move downwardly, and each crank-operated rod is provided at its lower end with at least one depending conveying tine, which preferably consists of a resilient double tine and at least during part of the movement of the respective crank-operated rod away from the body of silage moves over the bottom plate preferably at a small distance therefrom, which bottom plate extends under all juxtaposed crank-operated rods and is trough-shaped on the side that faces away from the working tools.

This design affords the advantage that the tools which penetrate the body of silage detach small parts of silage from the body thereof at locations which are uniformly spaced apart, and said detached silage is moved uniformly downwardly by said tools and by the cooperation between said tools and the vertical, preferably resilient tines is fed into the preferably trough-shaped bottom plate of the conveyor, e.g., a conveyor screw, from which the silage which has been removed is discharged by a material-handling blower or a belt conveyor. In that case, silage will be removed at a high rate because the tools carried by the crank-operated rods act throughout the height of the body of silage at the same time.

Owing to the uniform transmission of force and the balanced revolution at a relatively low speed, the unloader may be provided with a light-weight frame so that it can be connected to the lifting gear of a tractor or possibly to a coupling device of a feed trailer without difficulty.

Besides, the rate at which silage is removed can be controlled by an adjustment of the depth of penetration of the working tools. For this purpose, it is possible within the scope of the invention to provide struts, which are disposed laterally and/or between the crank-operated rods and engage the body of silage and are adjustably connected to the frame, in an arrangement in which the distance from the engaging surfaces of the struts in the paths along which the working tools move in the body of silage near the upper and lower ends of the crank-operated rods, respectively, can be mutually independently adjusted. Besides, the struts may be designed to scrape off any silage which adheres to the working tools.

Within the scope of the invention, each crank-operated rod may carry in known manner different working tools, which are arranged in at least two rows and consist of tearing, cutting or scraping tools in alternation.

Confined silo cavities are usually confined by two longitudinal walls and one end wall of concrete etc. To enable a removal of silage from such silo cavities throughout the depth thereof, a preferred feature of the invention resides in that in the removing apparatus the frame thereof that carries the crankshafts is mounted on a mounting bracket or mounting frame, which in known manner is self-propelled or can be coupled to a carrying vehicle, and said frame of the removing apparatus is pivoted to said mounting bracket or mounting frame by means of parallel links to be pivotally movable laterally beyond the carrying vehicle or is connected to said mounting bracket or mounting frame by means of backing rollers, which engage section rails and permit of a displacement of the apparatus frame, which can be fixed in several adjusted positions.

An illustrative embodiment of the invention will now be explained more fully with reference to the accompanying drawings, in which FIG. 1 is a side elevation showing an unloader that is mounted on a tractor and FIG. 2 is a front elevation showing the unloader and a mounting frame.

In the embodiment of the invention shown in the drawings, an unloader 1 for taking feed from a horizontal silo comprises as main components a removing apparatus 2 and a conveyor 3, which by means of a mounting frame 4 is secured to a carrying vehicle 5, such as an agricultural tractor. The fixation may be effected by a three-point suspension comprising two lower links 6 and an upper link 7, which is variable in length. These links are connected to the mounting frame 4 by pivots 8 and 9. A drive shaft 10 connects the power take-off shaft 11 of the carrying vehicle 5 to a transmission 12 mounted on the mounting frame 4.

The removing apparatus 2 also comprises an inclined frame 13, which is shown in FIG. 1 and is slidably secured to the mounting frame 4. For this purpose the mounting frame is provided with profiled guide rails 14 and 15, which receive backing rollers 17 and 17', which are connected to the frame 13 directly or by struts 16. The backing rollers 17 received by the lower profiled guide rail 14 are mounted for rotation on horizontal axes. The backing rollers 17' received by the upper guide rails 15 are mounted for rotation about vertical axes.

The removing apparatus can be laterally offset from the mounting frame 4 if the frame 13 is connected by parallel links. In any case the arrangement is such that the removing apparatus 2 can be fixed in any desired position relative to the mounting frame 4.

Because the removing apparatus 2 can be laterally offset from the frame 4 and the carrying vehicle 5, even a removing apparatus which is narrower than the carrying vehicle 5 can be used to remove silage disposed as far as to the side walls of the horizontal silo.

In the embodiment shown by way of example, crankshafts 18 and 19 having three cranks each are rotatably mounted in the frame 13 of the removing apparatus. Crank-actuated rods 20 are pivoted to corresponding cranks of the crankshafts 18 and 19. The cranks of the crankshafts 18 and 19 are uniformly angularly spaced apart. The lower crankshaft 18 is connected by a vee belt 21 to the transmission 12 carried by the mounting frame 4 and is rotated so that the crank-operated rods 20 and their working tools 22 during their downward movement (arrow 23) penetrate the body of silage 24 and detach silage from said body and convey said detached silage downwardly. More than three crank-operated rods, e.g., six rods, may be provided.

The depth of penetration of the working tools 22 carried by the crank-operated rods 20 is determined by the position of the carrying vehicle 5 relative to the body of silage 24. To ensure that the depth of penetration of the working tools 22 can be more simply maintained, struts, not shown on the drawings, may be provided laterally beside the crank-operated rods 20 or between them and said struts may be adjustably connected to the frame 13 of the removing apparatus 2. The struts are preferably secured to the frame 13 at the top and bottom thereof so as to be adjustable independently of each other. The struts which engage the body of silage on that surface thereof which faces the unloader 1 are additionally used to scrape off any silage which adheres to the working tools when the latter move away from the body of silage 24 during the operation of the unloader 1.

Each crank-operated rod 20 is provided at its lower end with depending conveying tines 25, which may consist, e.g., of resilient forks or double tines. When silage has been detached from the body and has been conveyed downwardly by the working tools 22, it is conveyed by said conveying tines 25 to the conveyor 3 over a floor plate 26, which is connected to the mounting frame 4. For this purpose the arrangement is such that the conveying tines move over the floor plate at a small distance therefrom while the crank-operated rods 20 perform the movement 27 away from the body of silage. The floor plate 26 extends below the crank-operated rods 20 and is trough-shaped on the side which faces away from the working tools. A conveyor screw 28 is disposed over the floor plate and by means of a vee belt 21' is rotated by the transmission 12 to convey detached silage from both sides over the floor plate 26 to the inlet of a material-handling blower 29. The floor plate 26 is raised on both sides and in the middle. The material-handling blower 29 conveys the silage through an adjustable delivery pipe bend 30 to a feed trailer or the like, which is not shown. The conveyor screw 28 and the material-handling blower 29 may be replaced by a belt conveyor. If the discharge is effected by a belt conveyor, the inclination of the latter may be adjustable and said belt conveyor may directly receive the silage, without an interposed conveyor screw, particularly if the apparatus is narrow and comprises two to six crank-operated rods.

As is particularly apparent from FIG. 2, two chain sprockets 31 disposed outside the frame 13 of the removing apparatus 2 are non-rotatably connected to each of the crankshafts 18 and 19. Chains 32 are trained around these chain sprockets and carry scraping tools 33, These chains revolving outside the frame 13 serve two purposes: In the first place they serve to detach from the body 24 any silage which directly contacts the silo wall. In the second place they ensure exact synchronization between the lower and upper crankshafts 18 and 19. It is also clearly apparent from FIG. 2 that the removing apparatus is offset to the left relative to the mounting frame so that the left-hand chain 32 protrudes laterally from the mounting frame 4.

It is also clearly shown in FIG. 2 that the floor plate 26 is trough-shaped adjacent to the conveyor screw 28.

Because in the unloader according to the invention the crank-operated rods 20, which are inclined toward the body of silage 24, and the working tools 22 carried by said rods and consisting, e.g., of tearing, cutting and scraping tools, in alternation, penetrate the body of silage 24 during their downward movement, the silage will be uniformly conveyed downwardly as far as to the floor plate 26 and from the latter under the action of the conveying tines 25 to the conveyor screw 28.

The unloader according to the invention may be directly connected to a feed trailer or may be self-propelled.

What is claimed is:

1. In an unloader for taking feed from a body of silage in a horizontal silo, comprising
    conveyor means for conveying feed out of said silo and
    a removing apparatus for detaching feed from said body of silage and for conveying detached feed to said conveyor means, said removing apparatus comprising
    two vertically spaced apart, horizontal crankshafts having a plurality of cranks,
    a plurality of juxtaposed crank-operated rods, which are pivoted to the cranks of said crankshafts and have one side adapted to face said body of silage,
    drive means for rotating said crankshafts in the same sense to move said rods up and down and toward and away from said body of silage,
    working tools carried by said rods on said one side thereof and adapted to enter said body of silage and to detach feed therefrom and to move the detached feed downwardly during the downward movement of the respective rods and to leave said body of silage during the movement of the respective rods away from said body; the improvement comprising
    a bottom plate extending under all of said crank-operated rods and on said one side and the opposite side thereof and arranged to receive feed which has been moved downwardly by said tools, said bottom plate having one said opposite side a trough-shaped portion associated with said conveyor means, and
    conveying tine means secured to each of said rods at the lower end thereof and adapted to move over in closely spaced relation to said bottom plate at least during part of the movement of the respective rod away from said body of silage.

2. An unloader as set forth in claim 1, which is adapted to take feed from a body of silage having a height up to a predetermined maximum, wherein
    the vertical extent of each of said rods is substantially as large as said predetermined maximum height.

3. An unloader as set forth in claim 1, in which said conveyor means comprise a conveyor screw disposed over said bottom plate and adapted to cooperate therewith, and a material-handling blower succeeding said conveyor screw.

4. An unloader as set forth in claim 1, in which said conveying tine means carried by each of said rods comprise two resilient tines extending downward at a substantial angle to said tools.

5. An unloader as set forth in claim 1, in which said tine means are arranged to be closely spaced above said bottom plate during said part of the movement of the respective rod away from said body of silage.

6. An unloader as set forth in claim 1, in which
    said crankshafts are rotatably mounted in an unloader frame,
    said unloader frame is connected to a mounting structure so as to be movable relative thereto to positions in which said unloader frame is laterally offset from said mounting structure and
    said unloader frame is adapted to be fixed to said mounting structures in a plurality of laterally spaced apart positions.

7. An unloader as set forth in claim 6, in which said mounting structure comprises a mounting bracket of a vehicle.

8. An unloader as set forth in claim 7, in which
    said unloader frame comprises rollers and
    said mounting structure comprises tracks for laterally guiding said rollers.

9. An unloader as set forth in claim 6, in which said mounting structure comprises a mounting frame.

10. An unloader as set forth in claim 9, in which said mounting frame is adapted to be coupled to a carrying vehicle.

11. An unloader as set forth in claim 6, in which said unloader frame is connected to said mounting structure by parallel links.